United States Patent [19]
Blomgren

[11] Patent Number: 6,058,974
[45] Date of Patent: May 9, 2000

[54] VALVE FOR CHANGING THE DIRECTION OF FLOW IN PIPES LEADING TO/FROM A HEAT-EXCHANGER

[76] Inventor: Ralf Blomgren, Älgvägen 13, S-239 34 Skanör, Skanör, Sweden

[21] Appl. No.: 09/214,043

[22] PCT Filed: Jul. 3, 1997

[86] PCT No.: PCT/SE97/01203

§ 371 Date: Dec. 23, 1998

§ 102(e) Date: Dec. 23, 1998

[87] PCT Pub. No.: WO98/01688

PCT Pub. Date: Jan. 15, 1998

[30] Foreign Application Priority Data

Jul. 4, 1996 [SE] Sweden .................................. 9602635

[51] Int. Cl.[7] .................................................. F16K 11/06
[52] U.S. Cl. ...................................... 137/625.43; 137/874
[58] Field of Search ................................ 137/625.43, 874

[56] References Cited

U.S. PATENT DOCUMENTS

| | | | |
|---|---|---|---|
| 4,203,469 | 5/1980 | Gates | 137/625.43 |
| 4,867,232 | 9/1989 | Dewill | 165/96 |

FOREIGN PATENT DOCUMENTS

| | | |
|---|---|---|
| 803 241 | 1/1951 | Germany . |
| 1 134 256 | 8/1962 | Germany . |
| 34 30 860 | 8/1994 | Germany . |

*Primary Examiner*—John Fox
*Attorney, Agent, or Firm*—Baker & Daniels

[57] ABSTRACT

The invention relates to a valve for changing the flow direction of a fluid in conduits, which conduct the fluid to and from, respectively, a heat exchanger. Heat exchangers used in systems where the cooling water is taken from natural streams, river water, sea water etc often have problems with clogging. A method of keeping the heat exchanger clean is to regularly backflush it, i e to reverse the flow direction for example a few times every day, so that silt and particles, which have got stuck in the inlet region of the heat exchanger, are flushed out the same way as they entered.

The valve according to the invention comprises a cylindrical casing and a valve body (18) enclosed therein. The conduits, which conduct the fluid to and from, respectively, said heat exchanger, are connected to two diametrically arranged connection tubes in the respective end plate on the casing, and by rotation of the valve body substantially 90° the valve body can be placed in two different positions, so that said fluid either is conducted via through passages (19 and 20) or via through passages (21 and 22).

18 Claims, 4 Drawing Sheets

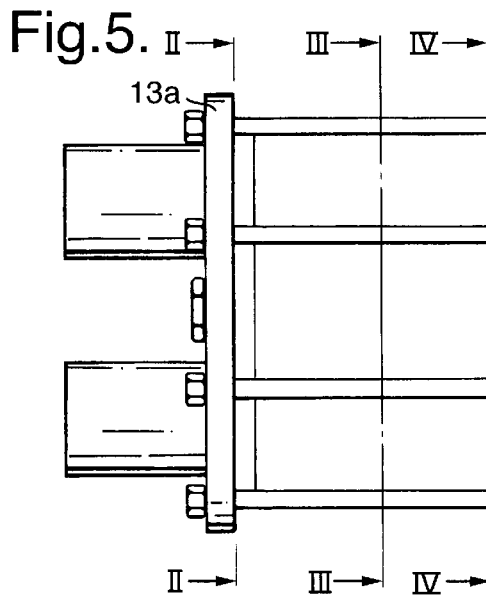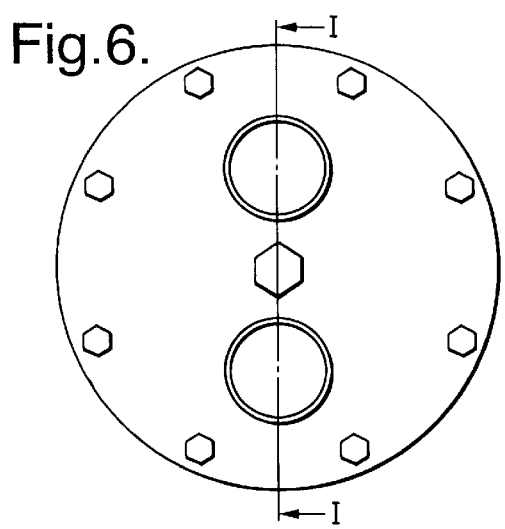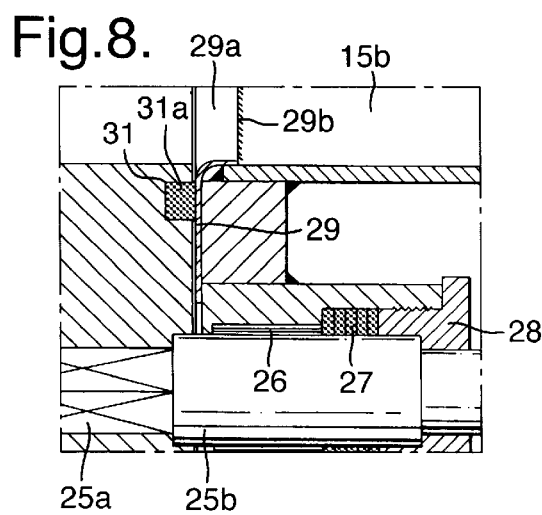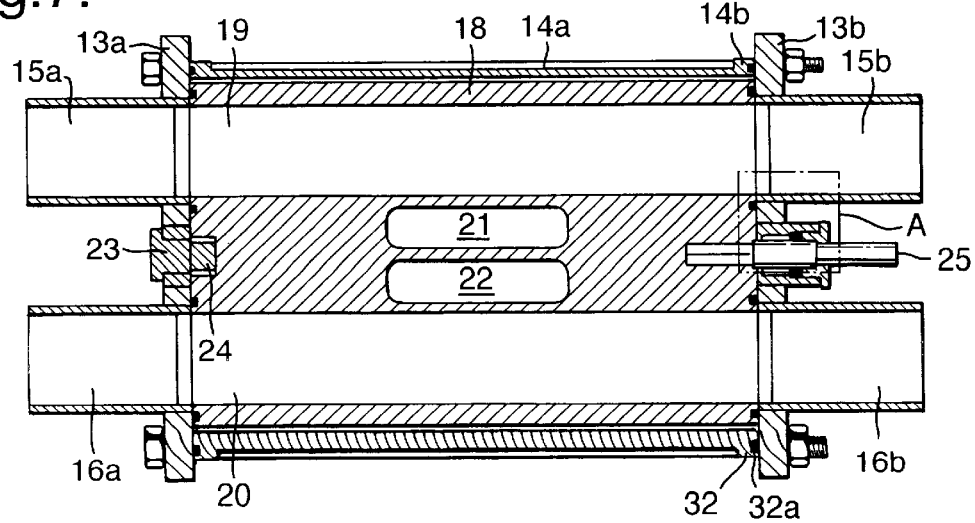

1

VALVE FOR CHANGING THE DIRECTION OF FLOW IN PIPES LEADING TO/FROM A HEAT-EXCHANGER

The present invention relates to a valve for changing the flow direction of a fluid in conduits, which conduct the fluid to and from, respectively, a heat exchanger, wherein said valve comprises a rotatable valve body and a surrounding valve housing consisting of a cylindrical casing with end plates, said valve body having a rotational axis coinciding with the imaginary axis of the cylindrical casing, and four through passages extend through the valve body so oriented that the main flow directions of the fluid are parallel with the rotational axis of the valve body and such that the openings in two through passages, when the valve body is in a first rotational position, are right in front of two openings in the respective end plate and that openings in the two other through passages, when the valve body is in a second rotational position, are right in front of said openings in the end plates.

Heat exchangers used in systems, where cooling water is taken from natural streams, river water, sea water etc, often have problems with clogging. The reason for this is on one hand that silt and particles get stuck in the cooling channels, on the other hand biological growth.

A simple and environmentally-friendly way to keep a heat exchanger decently clean is to backflush it regularly, i e the flow direction is reversed for example one or a couple of times each day. By reversing the flow direction silt and particles, which have got stuck in the inlet region of the heat exchanger, will be flushed out the same way as they entered.

Such a backflushing system is usually constructed of four valves and two tubes, which connect the inlet and outlet conduits. The investment cost for such a system is often rather great in comparison with the cost for the heat exchanger. Backflushing is therefore not used to such an extent as it should, which leads to unnecessary energy losses due to a decreased efficiency of the heat exchanger. The described type of backflushing system has also another drawback, namely the risk for closing or opening wrong valves. With four valves, each having two positions, 16 combinations for the valve positions are possible, which poses high demands on the reliability of the control and supervision systems.

A valve of a similar kind as that proposed by the invention is known for example through U.S. Pat. No. 4,203,469, which describes a valve for use in a cooling system. This valve consists of a rotatable cylindrical body and a valve housing, consisting of a casing and two end plate parts, in which several components substantial for the function of the valve have been integrated. In each end plate there are two tubes extending out for connection of the valve to conduits, and these tubes are oblique in relation to the rotational axis of the valve body. One of the end plates has a sealing washer, which is applied against one end surface of the valve body by means of a spring, and in the other end plate there is an electrical device for rotation of the valve body. This embodiment is best suited for systems with comparatively small tube dimensions and is in several ways less suitable for big valves due to its complexity. With this design the risk for functional disturbances would be very great at use in a cooling water system, where the moist load is very great, especially if sea water is used for cooling, as it is very corrosive. The valve described in U.S. Pat. No. 4,203,469 is also comparatively voluminous, as the four through passages extend in such a way through the valve body that all the four through passages cross the same diameter in the intermediate portion of the valve body. The cross section of the intermediate portion of the valve body has a greatest dimension which is considerably greater than the sum of the diameters of the through passages.

The object of the present invention is to considerably reduce the cost for a backflushing system for a heat exchanger and to provide a system which is simpler to handle.

The cost can be reduced in that four valves are replaced by one and in that the tubing is simplified. The construction of the valve has also great importance for the cost, wherefore a simple construction with little machining is looked for. In the description below such an embodiment is described.

The handling is simplified by the fact that only one valve is to be operated at backflushing and that the valve only has two positions. Due to this simplicity there is no demand for an advanced control system for example for remote control of the backflushing valve. The valve can be controlled by means of a cylinder or a pivot device, which can move between two end positions.

A possible embodiment of the invention is described below under reference to FIGS. 1–12.

FIG. 1 schematically shows a backflushing device according to an earlier known principle.

FIG. 2 schematically shows a backflushing valve according to the present invention.

FIG. 3 is a perspective view of the backflushing valve.

FIG. 4 schematically shows a valve body and the principle for the arrangement of through passages.

FIG. 5 is a side view of the backflushing valve.

FIG. 6 is an end view of the backflushing valve.

FIG. 7 is a cross section along the line I—I through the backflushing valve in FIG. 6.

FIG. 8 is an enlargement of the area A in FIG. 7.

Figure 1:
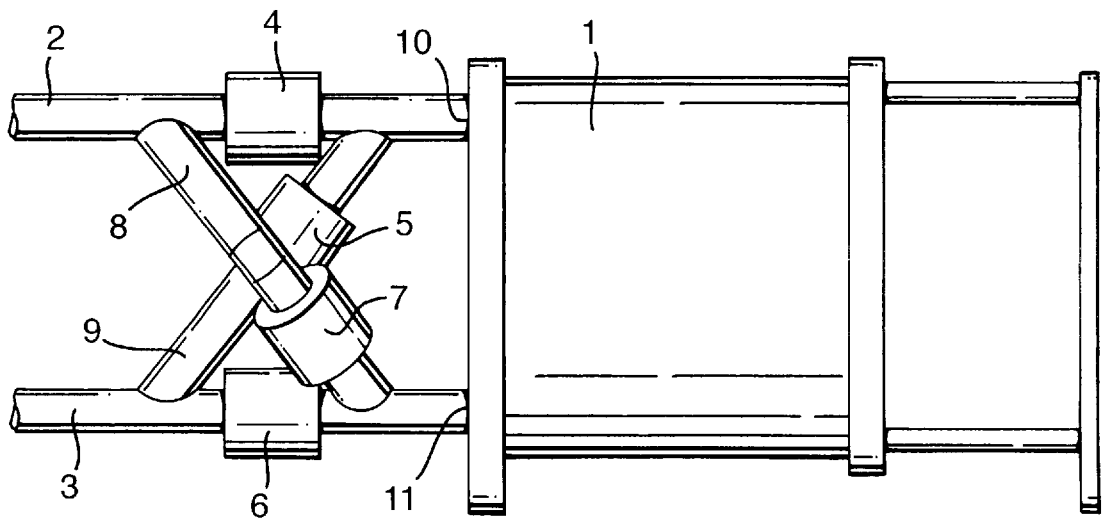

FIG. 1 shows a plate heat exchanger 1 with a valve arrangement 4–7, which enables an inversion of the flow in the heat exchanger and thus a backflushing of the heat exchanger in spite of unchanged flow direction in conduits 2 and 3, which conduct fluid to and from, respectively, the heat exchanger.

At normal operation the valves 4 and 5 are open and the valves 6 and 7 are closed. In the Figure the conduit 2 is an inlet conduit and the conduit 3 an outlet conduit, which means that fluid will enter through the conduit 2, through the valve 4 and into the heat exchanger through an inlet port 10. After having passed the heat exchanger the fluid will leave through the outlet port 11 and passes through the valve 6 and further through the conduit 3. At a backflushing of the heat exchanger the valves 4 and 5 are closed and the valves 6 and 7 open. The fluid entering through the conduit 2 is hereby forced down into a conduit 8 and through the valve 7 and into the port 11. The fluid passes thereafter the heat exchanger in a direction which is opposite to the normal flow direction. The fluid is led out through the port 10, passes the valve 5 and a conduit 9 to be transported away in the conduit 3.

Figure 2:
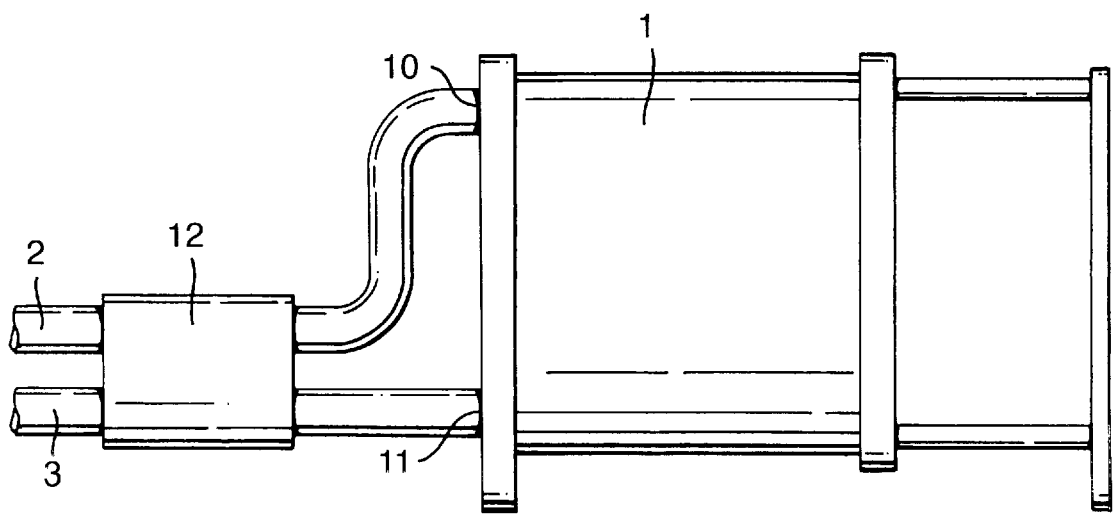

FIG. 2 shows the plate heat exchanger 1 with a backflushing valve 12 on the inlet and outlet conduits 2 and 3, respectively. The backflushing valve has the same function as the valves 4–7 and the conduits 8 and 9 in FIG. 1.

At normal operation a valve body of the backflushing valve is rotated to such a position, that the inlet conduit 2 is connected to the inlet port 10 and the outlet conduit 3 with the outlet port 11 via two preferably cylindrical through passages in the valve body.

At backflushing the valve body is rotated to another position, so that the inlet conduit 2 becomes connected with the outlet port 11 and the outlet conduit 3 with the inlet port 10. The design and function of the backflushing valve is further described with reference to FIGS. 3–12.

Figure 3:
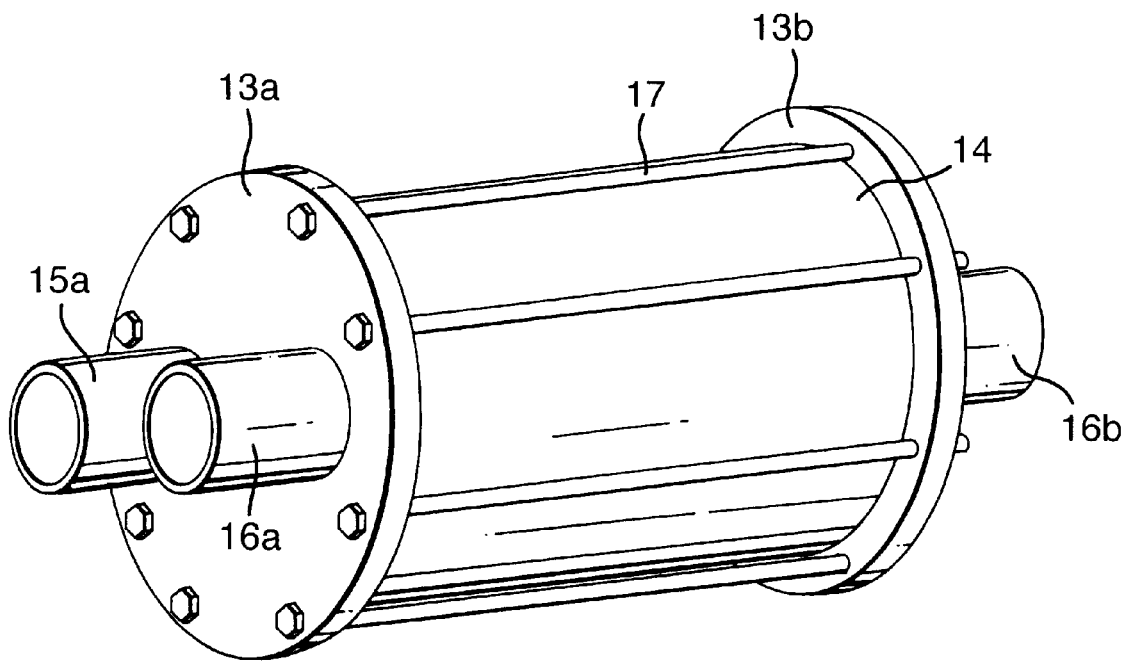

FIG. 3 shows a backflushing valve of the same type that was described under reference to FIG. 2, but it is here shown rotated 90° in comparison to the valve in FIG. 2. The valve housing comprises two plane end plates 13a and 13b, a casing 14 and screw joints 17, keeping the end plates and the casing together. On the two end plates 13a and 13b there are outwardly extending connection tubes 15a, 15b, 16a and 16b, which are connected to the conduits conducting fluid to and from, respectively, the heat exchanger. The connecting tubes are here shown without any flanges or other type of tube connectors, but they can of course be provided with such means.

Figure 4:
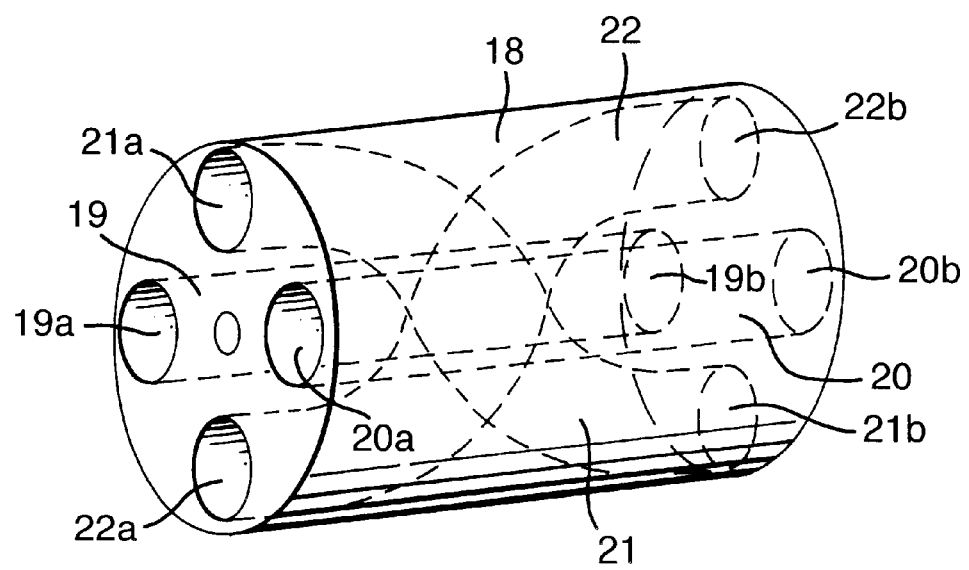

FIG. 4 schematically shows a valve body 18 in the position it assumes at normal operation, when it is arranged in a valve oriented as the valve in FIG. 3. Four through passages 19–22 extend through the valve body and opens at the two end of the valve body in openings 19a–22a and 19b–22b, respectively. The openings are evenly distributed with an angle of 90° at the same distances from the rotational center of the valve body. The through passages 19 and 20 are parallel with the imaginary longitudinal axis of the valve body also constituting its rotational axis, are diametrically arranged and preferably have generally circular sections, and at normal operation the valve body has such a rotational position that the fluid flow passes through these through passages, so that the backflushing valve does not give rise to a higher pressure drop than tubes with a corresponding length would give.

The through passages 21 and 22 extend obliquely through the valve body, so that the openings of the passages are displaced 180°. If the valve body is rotated 90° around its longitudinal axis and is contained in the valve housing in FIG. 3, the connection tube 15a will be connected to the connection tube 16b and 16a with 15b, so that the change of the flow direction of the fluid which is the purpose of the invention is attained.

The two end plates 13a and 13b as well as the casing 14 are held together by a screw joint having long screws 17a, which extend through the end plates, and each screw has a nut 17b in one of its ends, which is shown in FIG. 5. By tightening the screw joint well the end plates and the casing form a stiff and durable unit, withstanding the forces and torques which normally arise in conduits of the actual kind.

FIG. 6 is a view of the left end plate of the valve shown in FIG. 5. The valve described herein has circular end plates, but other shapes are also possible. For a small valve it can for example be enough with two screws, and in such a case the end plates can have an elongate shape, and if the valve has four screws, it is probably most suitable with square end plates in view of costs.

FIG. 7 shows the valve body 18 in a position where the through passages 19 and 20 are right in front of the connection tubes 15a and 15b and 16a and 16b, respectively. The two oblique through passages 21 and 22 have rather elongate sections in the central part of the valve body in order to enable a decrease of the valve body diameter.

The casing 14 consists of a barrel 14a, which in its ends is provided with flanges 14b, and in each flange there is a gasket groove 32 with a gasket 32a sealing against the end plates 13a and 13b, respectively. The internal side of the casing is contacted by fluid, and accordingly the casing is preferably made in a material with satisfactory corrosion qualities, like stainless steel, titanium or reinforced plastic. If the casing is made in a metallic material, the flanges preferably are rings welded to the barrel. If the material in the casing is reinforced plastic, the flanges are integrated in the casing at the manufacture.

In the two flat end surfaces of the valve body there is a gasket groove 31 with a gasket 31a around each opening 19a–22a and 19b–22b, respectively, and these gaskets engage a seal against the end plates 13a and 13b. A certain pressure drop always occurs in a heat exchanger, which means that the pressure is somewhat higher in the inlet conduit than in the outlet conduit. For preventing this pressure difference from creating a leakage from the inlet conduit to the outlet conduit at least one of two cooperating through passages must be sealed around the openings. FIG. 8 shows a gasket in engagement with a covering plate 29 on the end plate.

The end plates 13a and 13b must be rather sturdy in order to be able to withstand the fluid pressure which may appear in the valve. On one hand the requirements of pressure vessel authorities with regard to admissible strain level must be satisfied, on the other hand the deflection shall not be too great, because that results in a lower gasket pressure of the gaskets 31a with resulting risk for leakage. By making the end plates of a low alloy pressure vessel steel a satisfactory strength can be obtained at a decent cost, and the inner side of the end plate is covered with a covering plate 29 in order to prevent corrosion attacks. These covering plates need not cover the entire inner sides of the end plates, but they must be at least so large that the gaskets 32a engage them. FIG. 8 shows that the covering plate 29 is welded to the connection tube 15b. At the connection tube there is a collar 29a in the covering plate, and the collar extends into the connection tube, so that a tight weld 29b can be applied without any risk for the material in the covering plate to be contaminated by the low alloy steel in the end plate.

The valve body is so suspended that it can be rotated around its longitudinal axes. A stub axle 23 is threaded into the end plate 13a, and its outer end is constituted by a smooth cylindrical part, and there is a bearing 24 in the valve body for preventing wear of the material in the valve body at its rotation. The right end of the valve body is suspended in a slightly different way, as the torque required to rotate the valve body is introduced via the stub axle 25 which also constitutes a part of the suspension device. The stub axle 25 is designed with a square section of the part 25a introduced in the valve body, whereas the hole in which it is introduced has a corresponding section, so that the stub axle is rotationally stiff in the valve body. It is of course possible to prevent mutual rotation between stub axle and valve body in other ways, such as a key joint. The stub axle 25 has a cylindrical part 25b, which is journalled in the end plate 13b in a bearing 26 taking up radial forces.

A fluid passing through the valve has a certain overpressure in relation to the surroundings, and a sealing 27 is provided for preventing the fluid from leaking out. For securing a proper function of the sealing a certain compression of the sealing material is needed, and for this purpose there is a nut 28, which at tightening compresses the sealing, provided that the latter has a certain excess size before the tightening. The nut also prevents the stub axle 25 from sliding out of the valve body in that the nut engages the outer end surface on the cylindrical part 25b of the stub axle. The nut should therefore be made in a material with good journal properties, such as bronze.

Figure 9:
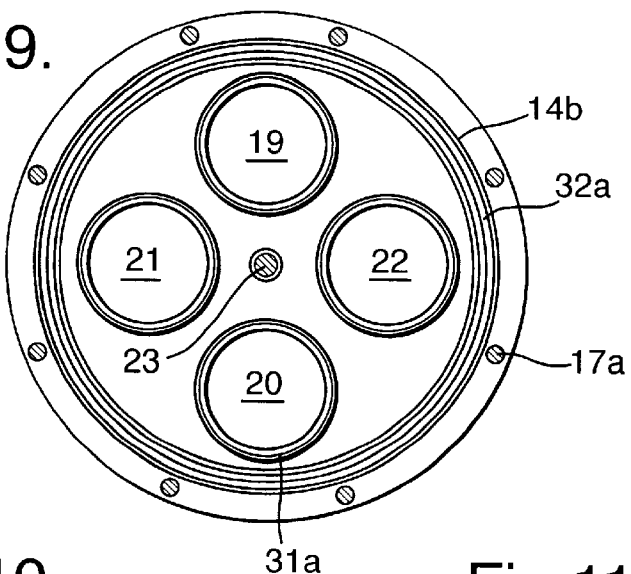
FIGS. 9–11 show cross sections along the lines II—II, III—III and IV—IV, respectively, through the backflushing valve in FIG. 5.

FIG. 9 shows the end surfaces of the valve body 18 and the casing 14. The section II—II is taken in the joint between the end plate 13a and the valve body 18 and the casing 14, respectively, so that the section only cuts through the screws 17a and the stub axle 23. The gasket 31a is visible around each through passage 19–22, and the gasket 32a is visible in the flange 14b.

Figure 10:
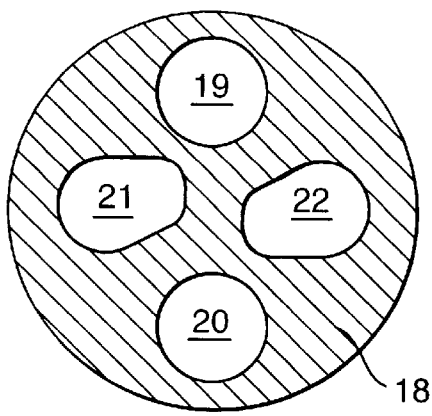
Figure 11:
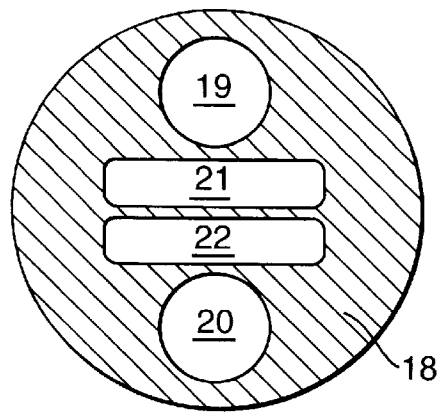

It appears from the sections II—II, III—III and IV—IV shown in FIGS. 9, 10 and 11, respectively, how the sections of the through passages 21 and 22 are changed along the length of the valve body. By designing the through passages such that the sections are elongated in the central part of the valve body, where all the four through passages cut the same diameter of the valve body, the dimensions of the valve can be kept down. This is desirable for several reasons. On one hand the manufacturing cost is dependent on the size of the valve, so that a smaller valve is cheaper to manufacture than a big one, on the other hand it is advantageous at installation if the valve is small, as its space demand is smaller and it is more convenient to handle.

The shown valve has two through passages having circular cross sections along their entire length, whereas the two other through passages have varying cross sectional shapes. If all four through passages have cross sections whose shape vary along the length and which are elongate where they cross the same diameter, the dimension of the valve can decrease somewhat in relation to the shown valve.

Figure 12:
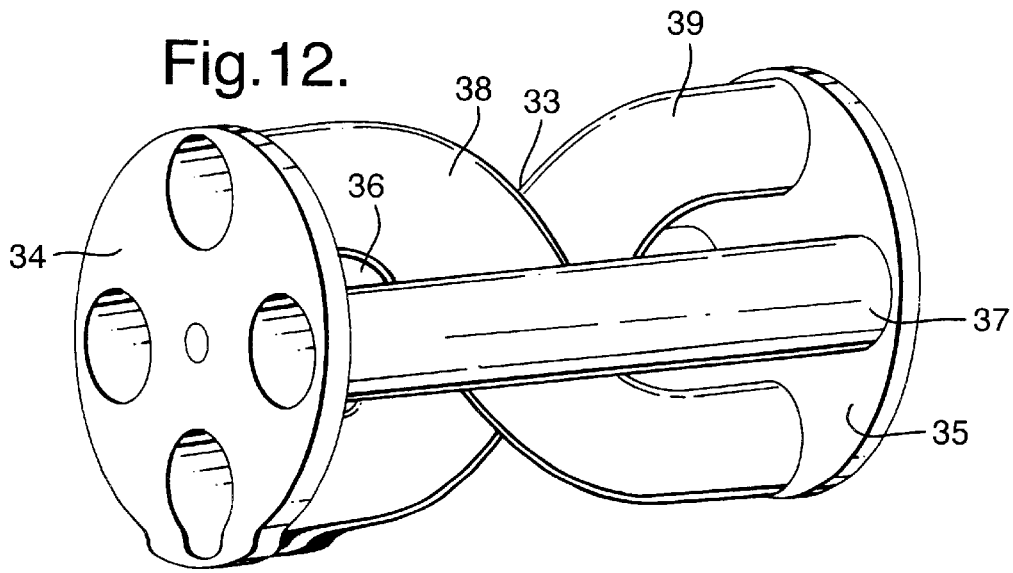
FIG. 12 shows an alternative embodiment of a valve body.

FIG. 12 shows an alternative embodiment of a valve body 33, which consists of two end plates 34 and 35 and between these end plates four tubes 36–39. Said tubes connect the openings in the end plates in the same way as the through passages 19–22 connect the openings in the valve body 18, i e two diametrically arranged tubes are parallel with the imaginary longitudinal axis of the valve body and two tubes extend from their respective opening in one end plate to a diametrically arranged opening in the other end plate.

The valve body 33 is preferably made in a material which on one hand is stiff and form-stable, on the other hand has a good corrosion resistance, such as for example metal, ceram or reinforced plastic. It can of course also be built up of several joined details made of different materials.

The flow resistance in the through passages of the valve body shall be as low as possible. For minimizing this resistance the hydraulic diameter for each through passage should be the same as for the connecting tubes 15a, 15b, 16a and 16b. At normal operation the two through passages parallel with the rotational axis of the valve body are preferably used for fluid passage, because these passages do not give rise to any additional pressure losses in comparison with a straight tube. The two other through passages extending obliquely through the valve body give rise to a somewhat greater pressure loss, as the fluid flow is forced to change direction, but as the backflushing only occurs during shorter time periods, the total increase of the pumping energy is only marginal.

The design of the backflushing valve with a valve body enclosed by a valve housing consisting of two planar end plates and a casing means that the boundaries between the end plates and the intermediate parts—the valve body and the casing—are plane parallel. This means in turn that the casing and the valve body can be disassembled and assembled very easily at maintenance work. At this assembly only the screw joint 17 and the stub axles 23 and 25 have to be removed. Thereafter the casing and the valve body can be transferred radially, so that they become free from the end plates. Neither the inlet conduit nor the outlet conduit need to be disassembled at maintenance work with the backflushing valve.

The backflushing valve described above has a valve housing with two removable end plates, but it is also possible to have an embodiment where one end plate is permanently attached to the casing and one end plate is removable. The casing should then be provided with a sturdy flange, which admits attachment of the loose end plate with preferably some kind of a screw joint, for example with screws extending through holes in the flange and the end plate or with hook screws.

I claim:

1. A valve (12) for changing the flow direction of a fluid in conduits (2, 3), which conduct the fluid to and from, respectively, a heat exchanger (1) wherein said valve (12) comprises a rotatable valve body (18) and a surrounding valve housing consisting of a cylindrical casing (14) with end plates (13a, 13b), said valve body (18) having a rotational axis coinciding with the imaginary axis of the cylindrical casing (14), and four through passages (19–22) extend through the valve body (18) so oriented that the main flow directions of the fluid are parallel with the rotational axis of the valve body (18) and such that the openings (19a–20b) in two through passages (19, 20), when the valve body (18) is in a first rotational position, are right in front of two openings in the respective end plate (13a, 13b) and that the openings (21a–22b) in the two other through passages (21, 22), when the valve body (18) is in a second rotational position, are right in front of said openings in the end plates (13a, 13b), characterized in that two opposite through passages (19, 20) are substantially parallel with the rotational axes of the valve body (18) and that the two other through passages (21, 22) extend obliquely through the valve body (18), so that their respective ends (21a–22b) are displaced about 180°, and that at least two of the through passages (19–22) do not have circular sections in the middle portion of the valve body (18).

2. A valve (12) according to claim 1, characterized in that the valve housing has two plane end plates (13a, 13b) of substantially even thickness, each end plate having two diametrically arranged connection holes, so positioned that the connection holes in one end plate (13a) are right in front of the connection holes in the other end plate (13b).

3. A valve (12) according to claim 2, characterized in that the valve housing consists of a cylindrical casing (14) and two removable end plates (13a, 13b) and that the end plates (13a, 13b) are attached to the casing (14) at the tightening of said screws (17a).

4. A valve (12) according to claim 2, characterized in that the valve housing consists of a cylindrical casing with a permanently attached end plate and a removable end plate, which is attached to the casing by screw joints along the periphery of said end plate.

5. A valve according to claim 2, characterized in that tube-shaped devices (15a–16b) for connecting the valve (12) to the conduits (2, 3) are parallel with the rotational axis of the valve body (18).

6. Use of a valve (12) according to claim 2, characterized in that the valve (12) is adapted to change the flow direction of cooling water in a heat exchanger (1).

7. A valve (12) according to claim 1, characterized in that the valve housing consists of a cylindrical casing (14) and two removable end plates (13a, 13b) and that the end plates (13a, 13b) are attached to the casing (14) by screw joints along the outer periphery of the end plates (13a, 13b).

8. A valve (12) according to claim 7, characterized in that screws (17a) extend between the two end plates (13a, 13b), so that the latter are pressed against the casing (14) at the tightening of said screws (17a).

9. A valve according to claim 8, characterized in that tube-shaped devices (15a–16b) for connecting the valve (12) to the conduits (2, 3) are parallel with the rotational axis of the valve body (18).

10. Use of a valve (12) according to claim 8, characterized in that the valve (12) is adapted to change the flow direction of cooling water in a heat exchanger (1).

11. A valve according to claim 3, characterized in that tube-shaped devices (15a–16b) for connecting the valve (12) to the conduits (2, 3) are parallel with the rotational axis of the valve body (18).

12. Use of a valve (12) according to claim 7, characterized in that the valve (12) is adapted to change the flow direction of cooling water in a heat exchanger (1).

13. A valve (12) according to claim 1, characterized in that the valve housing consists of a cylindrical casing with a permanently attached end plate and a removable end plate, which is attached to the casing by screw joints along the periphery of said end plate.

14. A valve according to claim 13, characterized in that tube-shaped devices (15a–16b) for connecting the valve (12) to the conduits (2, 3) are parallel with the rotational axis of the valve body (18).

15. Use of a valve (12) according to claim 13, characterized in that the valve (12) is adapted to change the flow direction of cooling water in a heat exchanger (1).

16. A valve (12) according to claim 1, characterized in that tube-shaped devices (15a–16b) for connecting the valve (12) to the conduits (2, 3) are parallel with the rotational axis of the valve body (18).

17. Use of a valve (12) according to claim 16, characterized in that the valve (12) is adapted to change the flow direction of cooling water in a heat exchanger (1).

18. Use of a valve (12) according to claim 1, characterized in that the valve (12) is adapted to change the flow direction of cooling water in a heat exchanger (1).

* * * * *